US005370214A

United States Patent [19]

Katahira

[11] Patent Number: 5,370,214

[45] Date of Patent: Dec. 6, 1994

[54] MOVABLE MEMBER FEED DEVICE

[75] Inventor: Masayuki Katahira, Gunma, Japan

[73] Assignee: NSK Ltd., Tokyo, Japan

[21] Appl. No.: 135,028

[22] Filed: Oct. 13, 1993

[30] Foreign Application Priority Data

Oct. 14, 1992 [JP] Japan .................................. 4-300558

[51] Int. Cl.$^5$ .............................................. B65G 15/64

[52] U.S. Cl. .................................. 198/345.1; 198/750

[58] Field of Search .............................. 198/750, 345.1; 414/749; 269/73, 60

[56] References Cited

U.S. PATENT DOCUMENTS 2,885,920 5/1959 Livingston ............................ 82/135
3,109,335 11/1963 Gerchow .............................. 82/141
4,573,566 3/1986 Roman ............................ 198/750 X
4,768,698 9/1988 Brown et al. ...................... 296/60 X

FOREIGN PATENT DOCUMENTS 0482268 10/1990 European Pat. Off. .
58-109242 6/1983 Japan .
63-147245 9/1988 Japan .
02-4736 1/1990 Japan .
02-4737 1/1990 Japan .
0266359 3/1990 Japan .
0272254 3/1990 Japan .
0418751 2/1992 Japan .
2106821 7/1982 United Kingdom .

*Primary Examiner*—Cheryl L. Gastineau
*Attorney, Agent, or Firm*—Sughrue, Mion, Zinn, Macpeak & Seas

[57] ABSTRACT

It is an object of the invention to provide a movable member feed device which is able to set or control the position of an intermediate support so that it can increase the natural vibration frequency of a feed screw shaft effectively to thereby reduce the vibration of the feed screw shaft. The movable member feed device according to the present invention includes an intermediate support frame supported by a linear movement bearing fitted with a guide rail and free to move in the axial direction thereof, an intermediate support nut threadedly engaged with a feed screw shaft through a ball and supported by the intermediate support frame in such a manner that it is prevented from moving in the axial direction thereof with respect to the intermediate support frame but is free to rotate, an auxiliary feed screw having an axis parallel to a feed screw shaft an intermediate support feed nut threadedly engaged with an auxiliary feed screw and fixed to the intermediate support frame, and auxiliary feed screw drive means which moves the intermediate support frame according to the rotation of the feed screw shaft.

8 Claims, 4 Drawing Sheets

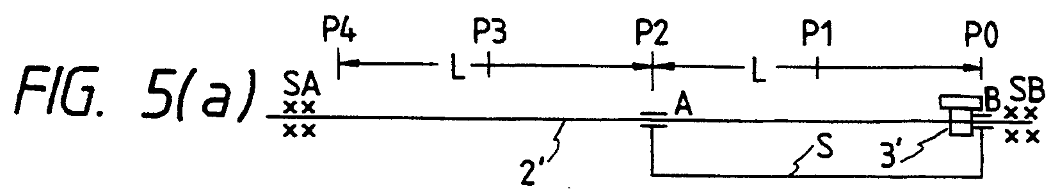
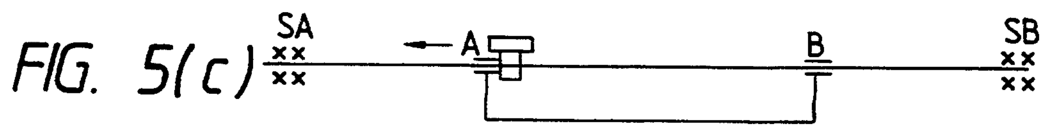
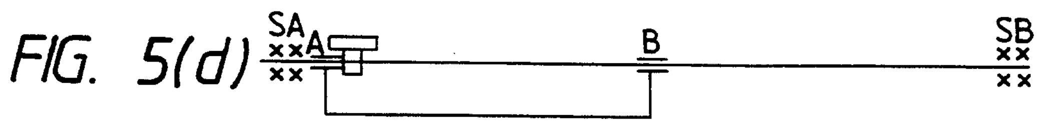
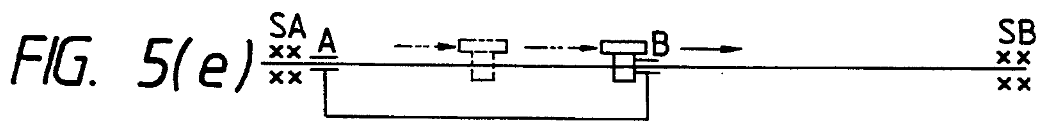
FIG. 5(e)
FIG. 6
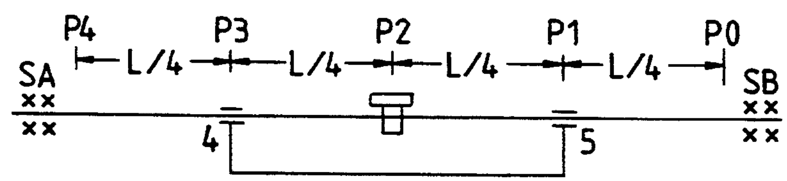

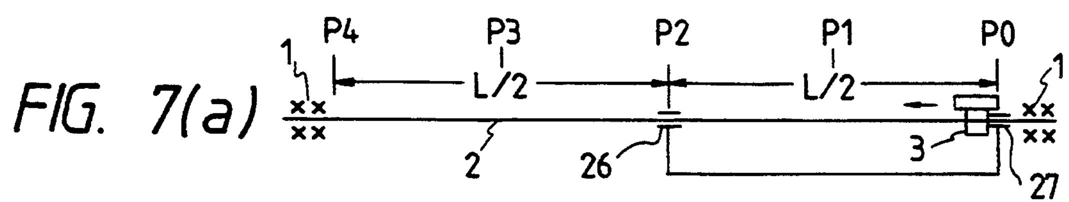
FIG. 7(a)
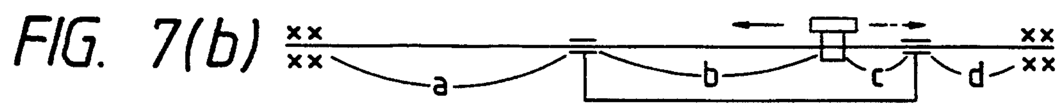
FIG. 7(b)
FIG. 7(c)
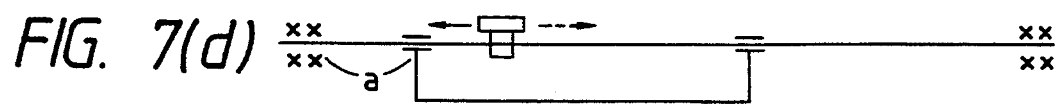
FIG. 7(d)
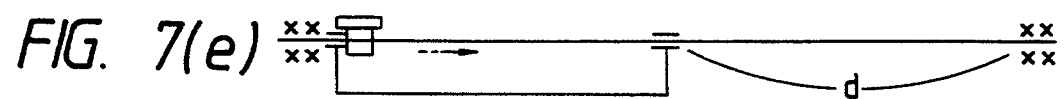
FIG. 7(e)

MOVABLE MEMBER FEED DEVICE

BACKGROUND OF THE INVENTION

The present invention relates to a feed screw shaft support device which supports auxiliarily the intermediate portion of a feed screw shaft in order to avoid the resonance of the feed screw shaft produced due to the fact that the dangerous speed of the feed screw shaft goes into a low number of rotation area, when the support span of the feed screw shaft is long.

When the number of rotation of a feed screw shaft approaches the natural vibration frequency of the feed screw shaft, then resonance is produced, which is dangerous. This dangerous speed is in inverse proportion to the square of the support span of the feed screw shaft. When a table stroke is long such as in a numerically controlled surface grinder, then the feed screw shaft to feed a table is lengthened and thus the support span of the feed screw shaft is also lengthened, so that the dangerous speed goes into a low rotation area. As the feed speed is increased, the feed screw shaft is used at a high number of rotation, that is, the feed screw shaft must be used in the dangerous speed area thereof. In this case, there is known means in which an intermediate support to support the intermediate portion of the feed screw shaft is provided to shorten the support span of the feed screw shaft to thereby raise the natural vibration frequency of the feed screw shaft.

In one of conventional means of the above type, as shown typically in FIG. 5, between two bearings SA, SB respectively for supporting the two end portions of a feed screw shaft 2', there is interposed an intermediate support S which is free to move in a feed direction and has two feed screw shaft support portions A, B, a nut 3' movable by means of rotation of the feed screw shaft is interposed between the two feed screw shaft support portions A, B, and, when the intermediate support S is in engagement with the nut 3', one of the feed screw shaft supports of the intermediate support S is pushed by the nut 3' to cause the intermediate support S to move together with the nut 3', so as not to prevent the movement of the nut 3' (for example, Japanese Patent Unexamined Publication No. Sho. 58-109242).

Also, there has been conventionally known a feed screw shaft support device in which a feed screw shaft includes two end portions, the two end portions are respectively free to rotate, a nut is threadedly engaged with the feed screw shaft, and an intermediate support holding the nut therebetween is movable in the screw shaft direction, the intermediate support is formed as a slide bearing to thereby support the screw shaft, the intermediate support is supported by a linear guide device, and pulley blocks each having a running block are disposed in parallel between the intermediate support, base member, and nut to thereby link the intermediate support to the nut, so that the support span of the screw shaft can be reduced sequentially as the nut is moved (for example, Japanese Patent Unexamined Publication No. Hei. 2-66359.

However, in the technology disclosed in the above-mentioned conventional device, Japanese Patent Unexamined Publication No. Sho. 58-109242, as shown in FIG. 5, due to the fact that the intermediate support S interposed between the bearings SA and SB (distance 2L) can be moved after the nut 3' interposed between the support portions A and B (distance L) of the intermediate support S comes in contact with either of the support portions A and B, when the nut 3' is moved left from the condition shown in FIG. 5(*a*) in which the nut 3' has moved to one end portion of the intermediate support, that is, when the nut 3' is present between the support portions A and B, the support span A-SA is determined as a difference L between the bearings SA, SB distance 2L and the intermediate support portions A, B distance L and cannot be shortened any further, so that the dangerous speed cannot be reduced to a desired degree. Further, since one support portion of the intermediate support S must be contacted with the nut 3' before the intermediate support S can be moved, when the nut 3' comes in contact with the intermediate support S, the mass of the intermediate support S is suddenly and heavily added to the mass of the table to hinder the high speed movement of the table, causing the moving speed of the table to vary unfavorably.

Also, the technology disclosed in the above-mentioned conventional device, Japanese Patent Unexamined Publication No. Hei. 2-66359, has the following problems:

(1) Due to the fact that the intermediate support is guided only by a linear guide different from a guide for the table (lines 2 to 15, column 3, page 3, in the same publication), and that the dimension of the slider in the axial direction thereof is shorter than a dimension from the slider to the screw shaft support portion, the intermediate support is easy to fall down and the intermediate support has a poor mobility;

(2) Since the support of the screw shaft by the intermediate support is achieved by the slide bearing and thus there is produced a slight clearance in the screw shaft support portion, the vibration of the screw shaft cannot be controlled sufficiently;

(3) Because the intermediate support and table are guided by different guide members, it is difficult to set the respective guide rails to be parallel accurately. For this reason, an unreasonable force can be often applied to the screw shaft.

(4) Since the intermediate support and nut are connected to each other by means of a belt, the relative position relationship between the intermediate support and nut is apt to shift due to the slip of the belt, so that the given position relationship of the screw cannot be kept accurately.

SUMMARY OF THE INVENTION

The present invention aims at eliminating the above-mentioned problems found in the conventional devices. Accordingly, it is an object of the invention to provide a screw shaft intermediate support device which is excellent in vibration prevention.

In attaining the above object, according to the invention, there is provided a movable member feed device including a movable member supported on a guide rail fixed on a base member and movable freely in the axial direction thereof by a feed screw shaft, which comprises: an intermediate support frame supported on a linear movement bearing fitted with the guide rail and movable freely in the axial direction thereof; an intermediate support nut threadedly engaged with the feed screw shaft through a ball, and supported by the intermediate support frame in such a manner that it is incapable of mutual movement in the axial direction thereof respect to the intermediate support frame; an auxiliary feed screw having an axis parallel to the feed screw shaft and supported on the base member; an intermediate support feed nut threadedly engaged with the auxiliary feed screw and fixed to the intermediate support frame; and, auxiliary feed screw drive means for moving intermediate support frame according to the rotation of the feed screw shaft.

An intermediate support nut is threadedly engaged with the feed screw shaft by means of a ball, the intermediate support nut is supported by an intermediate support frame by means of a slide bearing, and the intermediate support frame is supported by the two sliders of a linear movement bearing fitted to two guide rails which are the same guide rails as those used to guide a table. Thanks to this, when compared with an intermediate support frame supported by a linear movement bearing fitted to a guide rail different from a guide rail for guiding a table, the feed screw shaft and intermediate support can be set parallel to each other with accuracy and, therefore, the intermediate support can be stabilized well and can also be moved smoothly. Also, by previously applying a pressure to the slide bearing and intermediate support supporting slider which support the intermediate support nut, feed screw shaft and intermediate support nut, it is possible to eliminate the play of support of the feed screw shaft and intermediate support frame. Further, since the intermediate support is moved by an auxiliary feed screw drive means, the intermediate support can be moved to a desired position according to the rotation of a screw shaft for a table. And, the amount of movement of the intermediate support is free from the rotation of the feed screw shaft and depends only upon the rotation of an auxiliary feed screw.

BRIEF DESCRIPTION OF THE DRAWINGS

FIGS. 5(*a*) to (*e*) are explanatory views of the operations of a nut and an intermediate support according to a conventional movable member feed device;

FIG. 6 is a view to show the position of an intermediate support employed in the first embodiment; and, FIGS. 7(*a*) to (*e*) are explanatory views of the operations of a nut and an intermediate support employed in the first embodiment.

DETAILED DESCRIPTION OF THE PREFERRED EMBODIMENTS

Figures 1, 2:
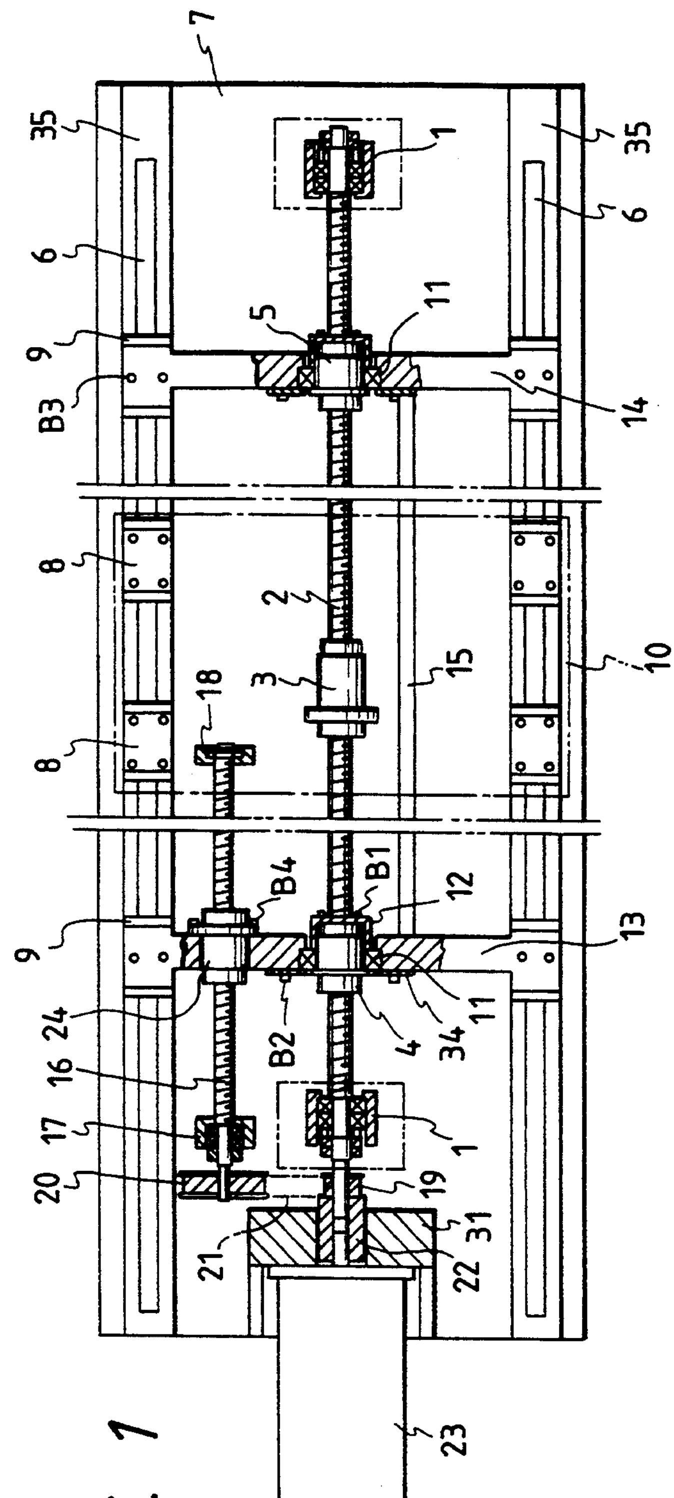
FIG. 1 is a plan view of a first embodiment of a movable member feed device according to the invention.
FIG. 2 is a front view of the first embodiment.

A base member 7 is formed in a longitudinally long flat plate shape and includes two guide rail mounting members 35 respectively provided on the two sides thereof. Two guide rails 6 are fixed to the guide rail mounting members 35 in such a manner that they are parallel to each other. Sliders 8 for a table are fitted to the guide rails 6 in such a manner that they are free to move in the axial direction of the guide rail. Above the table sliders 8, a table 10, which is a movable member, is fixed by means of table mounting members 28 in such a manner that the table 10 is free to move in the axial direction of the guide rail.

A feed screw shaft 2 is disposed in parallel to the guide rails 6, the two ends of the feed screw shaft 2 are supported in a freely rotatable manner by a support unit 1 fixed to the base member 7, and one end of the feed screw shaft 2 is fixed through a coupling 22 to the output shaft of a drive motor 23 fixed to the base member 7 through a motor bracket 31, so that the feed screw shaft 2 can be rotated by driving the drive motor 23. A table nut 3 is in threaded engagement with the feed screw shaft 2 and is fitted with and fixed to a nut housing 25 fixed to the bottom surface of the table 10.

A first intermediate support frame 13 is interposed between the drive! motor 23 and table nut 3 and a second intermediate support frame 14 is interposed between the table nut 3 and support unit 1 which is disposed on the opposite side to the drive motor 23. The first and second intermediate support frames 13, 14 are respectively fixed at the two ends thereof, by means of bolts B3, to intermediate support sliders 9, 9 which are respectively linear movement bearings fitted to the guide rails 6, 6. And, the first and second intermediate support frames 13, 14 can be moved in the same direction as in the direction in which the table is moved. The movements of the first and second intermediate support frames 13, 14 are guided by the guide rails 6, 6 as in the table 10, which makes it sure that the two intermediate support frames 13, 14 can be disposed in parallel to the table 10. The first and second intermediate support frames 13, 14 include holes formed concentric with the feed screw shaft 2. At the holes, a first intermediate support nut 4 is rotatably supported by the first intermediate support frame 13 through a bearing 11, while a second intermediate support nut 5 is rotatably supported by the second intermediate support frame 14. The first and second intermediate support nuts 4, 5 are in threaded engagement with the screw shafts of the feed screw shafts through balls, respectively.

With the outer peripheral surfaces of the first and second intermediate support nuts 4, 5 are threadedly engaged slide bearings 11 which are fixed by bolts B1 through brackets 12, respectively. The outer peripheral surfaces of the slide bearings 11 are fitted with the intermediate support frames 13, 13 and fixed by blots B2 through plates 34, respectively. The two longitudinal ends of the first and second intermediate support frames 13 and 14 are fixed to the intermediate support sliders 9 by bolts B3 respectively and the first and second intermediate support frames 13 and 14 are connected to each other by an intermediate support connecting member 15 at a given distance in the axial direction.

Between the feed screw shaft 2 and one of the guide rails 6, an auxiliary feed screw 16 having a ball screw groove twisted in the same direction and having the same pitch as the feed screw shaft 2 is disposed in parallel to the feed screw shaft 2 and one of the guide rails 6, while the two ends of the auxiliary feed screw 16 are rotatably journaled by a support unit 17 and a support bearing 18. An intermediate support feed nut 24 is in threaded engagement with the auxiliary feed screw 16 through a ball (not shown) and the outer peripheral surface of the intermediate support feed nut 24 is fixed to the first intermediate support frame 13 by a bolt B4.

In FIG. 1, the components of the present device that are disposed on the left side of the table nut 3, that is, the first intermediate support nut 4, slide bearing 11, first intermediate support frame 13, intermediate support feed nut 24 and intermediate support slider 9 constitute a first intermediate support 26. On the other hand, the second intermediate support nut 5, slide bearing 11, second intermediate support frame 14 and intermediate support slider 9, which are respectively disposed on the right side of the table nut 3, constitute a second intermediate support 27.

Now, description will be given below of the positions of the first and second intermediate supports 26, 27 with reference to FIG. 6. The two support units 1, 1 journaling the feed screw shaft 2 are expressed as SA, SB, respectively. And, five division points respectively dividing a distance L between SA and SB by $\frac{1}{4}$ are expressed as P0, P1, P2, P3 and P4, respectively. The positions of the first and second intermediate support nuts 4 and 5 are set in such a manner that, when the table nut 3 comes to the position P2, the first intermediate support nut 4 is situated at the position P3 and the second intermediate support nut 5 is situated at the position P1.

A timing pulley 19 is fixed to the shaft end of the feed screw shaft 2 and a timing pulley 20 is fixed to the shaft end of the auxiliary feed screw 16. A timing belt 21 is provided to stretch over the two timing pulleys 19, 20, so that the rotation of the feed screw shaft 2 can be transmitted to the auxiliary feed screw 16. The number of teeth of the timing pulley 20 is set double the number of teeth of the timing pulley 19.

If the feed screw shaft 2 is driven by the drive motor 23 and is thus rotated in a direction which is a clockwise direction when the motor is viewed from the rear side thereof, then the table nut 3 is moved in a direction to approach the motor and thus the table 10 fixed to the nut 3 is guided to a linear guide device and is then moved smoothly in the axial direction according to the rotation of the screw shaft. At that time, due to the fact that the first and second intermediate supports 26 and 27 are provided and the support span thereof is shortened, the dangerous speed is increased greatly by the number of rotation of the screw shaft to thereby be able to eliminate the production of the resonance of the screw shaft.

In the present embodiment, the table nut 3 is linked to the first intermediate support frame 13 by means of the timing pulleys 19, 20 and timing belt 21 and the second intermediate support frame 14 is connected to the first intermediate support frame 13 through the intermediate support connecting member 15, so that the first and second support frames are allowed to move together keeping the same distance between them. Now, description will be given below of the operation of the intermediate support with reference to FIG. 7. Division points, which divide a distance L between the support units 1, 1 respectively disposed at the two end portions of the intermediate support by $\frac{1}{4}$, are expressed as P0, P1, P2, P3, and P4, respectively. It is assumed that the table nut 3 and second intermediate support 27 are both situated at the right end point P0 of the feed screw shaft 2 (FIG. 7 (*a*)). At that time, the support span is at longest P2−P4=L/2, that is, between the left end of the feed screw shaft 2 (point P4) and the first intermediate support 26 (point P2). From this state, if the feed screw shaft 2 is rotated by the drive motor 23 to move the table nut 3 left and thus the table 10 is moved left, then the number of rotation of the feed screw shaft 2 is reduced down to $\frac{1}{2}$ by the timing pulleys 19, 20 and timing belt 21 is transmitted to the auxiliary feed screw 16, so that, because the feed screw shaft 2 and auxiliary screw 16 have the same pitch, the first and second intermediate supports 26 and 27 are also moved at a ratio of $\frac{1}{2}$ with respect to the amount of movement of the table nut 3.

Because the slide bearings 11 are fitted with the outer peripheral portions of the first and second intermediate support nuts 4 and 5 and also because, if the feed screw shaft 2 is rotated, then the first and second intermediate support nuts 4 and 5 are rotated in the same direction as the screw shaft 2 is rotated, the first and second intermediate support nuts 4, 5 are not moved with respect to the feed screw shaft 2. Therefore, the movements of the first and second intermediate supports 26, 27 can be conducted only by the rotation of the auxiliary feed screw 16 which can be rotationally driven through the timing pulleys 19, 20 and timing belt 21. Accordingly, when the table nut 3 is moved L/4 from the right end and reaches the point P1, the support span a between the left end support unit and first intermediate support 26 is equal to $\frac{3}{8}$L, that is a=$\frac{3}{8}$L, which is shortened by L/2 when compared with the conventional device (FIG. 7(*b*)). When the table nut 3 is further moved left by L/4 and reaches the point P2, the first intermediate support 26 has been moved left by L/8 and is situated at the point P3 and the support span a has been reduced down to L/4, that is, a=L/4 (FIG. 7 (*c*)). When the table nut 3 is moved left further L/4 and reaches the point P3, the first intermediate support 26 is also moved left further L/4 and is present at an intermediate position between the points P3 to P4, and the support span a has been reduced down to L/8, that is, a=L/8 (FIG. 7 (*d*)). Also, when the table nut 3 moves left further L/4 to the left end and reaches the left end point P4, the first intermediate support 26 has also moved further L/8 and is present at the left end point P4. At the then time, the support span a becomes 0, that is, a=0. On the other hand, the right-side second intermediate support 27 is situated at the point P2 and a support span d between the second intermediate support 27 and the right end point P0 becomes the longest, that is, d=L/2. (FIG. 7 (*e*)).

In this manner, the left support span a is reduced sequentially as the table nut 3 moves left and becomes zero when the table nut 3 arrives at the left end. On the other hand, the right support span d is enlarged sequentially with the leftward movement of the table nut 13 and it finally reaches L/2 which is the greatest span. When the table nut 3 gets to the left end portion of the feed screw shaft 2 and approaches the first intermediate support 26 situated on the left side of the present intermediate support, then a limit switch (not shown) is operated to stop the drive motor 23, whereby the rotation of the feed screw shaft 2 is caused to stop and at the same time the table 10 and first and second intermediate supports 26, 27 are also caused to stop so as to prevent the intermediate support and support unit from colliding with each other, that is, a safety measure is taken.

Next, when the drive motor 23 is rotated in the opposite direction (in this case, the limit switch is kept from operating), then the table nut 3, together with the table 10, begins to move in a direction to go away from the drive motor 23 in FIG. 1 (FIG. 7 (*e*)). Thus, the table nut 3 moves right from the left end sequentially in the order of FIG. 7 (*d*), (*c*), (*b*), and (*a*). That is, the table nut 3 moves in the opposite direction to its previous moving direction. In this case, the support span d between the right support unit 1 and the second intermediate support 27 is reduced successively.

The table nut 3 and the first and second intermediate support nuts 4 and 5 are in threaded engagement with the feed screw shaft 2 through balls to thereby form ball screws and the linear movement guide is executed by use of a linear guide device. Thanks to this, the table 10 and intermediate supports 26, 27 can be fed very smoothly even at high speeds with high followability and the vibration of the feed screw shaft 2 in the direction perpendicular to the axis thereof can be restricted, so that the table can be operated with high accuracy. Referring to the ball screws, the feed screw shaft and the respective nuts cooperate to form ball screws on the outer surface of the feed screw shaft, and pressures are previously applied to the ball screws through a large number of balls for sliding along ball sliding grooves respectively formed on the inner surfaces of the respective nuts. In the linear guide device, the guide rail 6 and table slider 8 are combined by means of a large number of previously pressed (pressure applied) balls for sliding along ball sliding grooves formed opposedly on the side surfaces of the guide rail 6 and table slider 8. The respective ball nuts 3, 4, 5 and table slider 8 are highly rigid, very light and stable, so that the linear movements of these components can be achieved with high accuracy. Also, because the linear movements of the first and second intermediate supports 26, 27 and table 10 are guided by the linear guide device using the same guide rails 6, 6 they can be moved in parallel with accuracy to thereby prevent the feed screw shaft 2 from suffering an unreasonable force.

When the table nut 3 moves a distance L, with the first and second supports 26, 27 moving with the movement of the table nut 3, and then reaches the right end portion of the feed screw shaft 2, then similarly as in the left end portion thereof the limit switch (not shown) is operated to stop the drive motor 23, whereby the rotation of the feed screw shaft 2 is caused to stop and at the same time the table 10 and first and second intermediate supports 26, 27 are caused to stop.

According to the above-mentioned first embodiment, except when the table nut 3 is present at the two end portions of the feed screw shaft 2, the support span of the feed screw shaft 2 given by the first and second intermediate supports 26, 27 is always shorter than the conventional support span, so that the shaft danger speed can be enhanced toward the safety side. Also, due to the fact that the movements of the first and second intermediate supports 26, 27 connected to each other by the intermediate support connecting member 15 are achieved by means of the timing pulleys 19, 20 and timing belt 21, there is eliminated the possibility that the slippage of the belt can shift a relative position relationship between the table and intermediate support, which could occur in a structure the intermediate support is moved by means of a pulley and a plane belt as disclosed in the previously described Japanese Patent Unexamined Publication No. Hei. 2-66359 filed by the present applicants.

Figure 3:
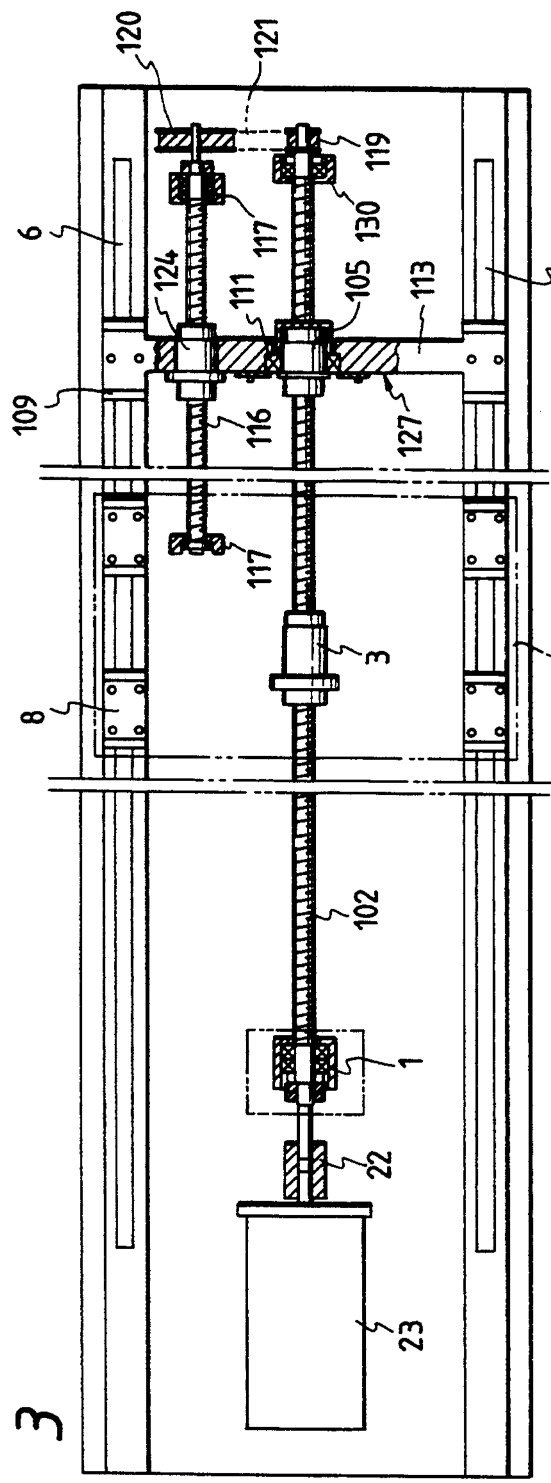
FIG. 3 is a plan view of a second embodiment of a movable member feed device according to the invention.

In FIG. 3, there is shogun a second embodiment of a movable member feed device according to the invention. In the second embodiment, the shaft end of the feed screw shaft 2 opposite to the drive motor 23 is supported by a support bearing 130 fitted with a bracket instead of the support unit 1 used in the first embodiment, the first intermediate support 26 is omitted and only the second intermediate support 27 is provided, and the second intermediate support 27 can be moved by ball screws similarly to the first embodiment. The second embodiment is also similar to the first embodiment in that an auxiliary feed screw 116 has a pitch equal to that of a feed screw shaft 102, and that the auxiliary feed screw 116 can be rotated at one half of the number of rotation of the feed screw shaft 102 by means of timing pulleys 119, 120 and a timing belt 121. As a result of this, when the feed screw shaft 102 is rotationally driven by the drive motor 23, then the table nut 3 is moved and the second intermediate support 127 is moved linking with the table nut 3 by one-half of the amount of movement of the table nut 3 in the same direction as the table nut 3, so that the second intermediate support 127 can be always supported almost centrally between the table nut 3 and support bearing 130 by the feed screw shaft 102, which makes it possible to enhance the dangerous speed of the feed screw shaft 102.

In the second embodiment, no intermediate support is provided between the support unit 1 and table nut 3 on the drive motor 23 side. This structure is employed when there is no space for provision of the auxiliary feed screw 16 on the near side of the drive motor 23. In the second embodiment, the support unit 1 fixes the feed screw shaft 102 by means of a bearing angular contact structure, and the table nut 3 and feed screw shaft 102 are in threaded engagement with each other through balls while a pressure has been previously given to them, whereby the feed screw shaft has no play due to the table nut and the natural vibration frequency of the feed screw shaft 102 is enhanced due to the support unit 1 and table nut 3 and thus the feed screw shaft 102 is hard to vibrate. Therefore, a structure having an intermediate support provided on one side can also be used effectively.

Figure 4:
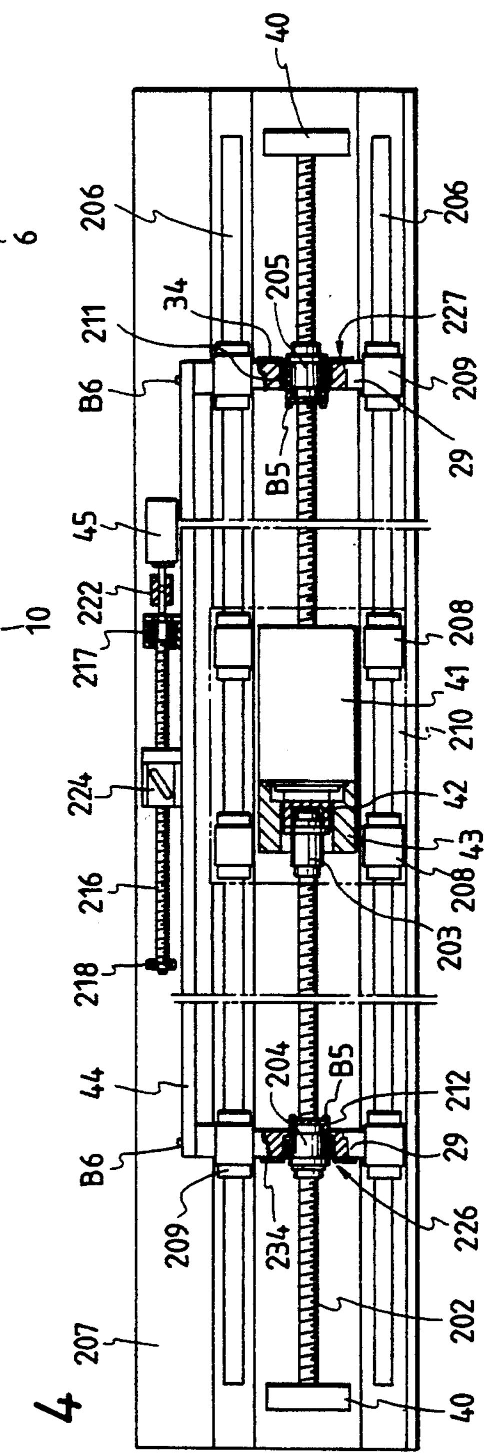
FIG. 4 is a plan view of a third embodiment of a movable member feed device according to the invention.

Now, in FIG. 4, there is shown a third embodiment of a movable member feed device according to the invention. A feed screw shaft 202 is a long ball screw shaft and the two ends thereof are fixed by fixing blocks 40, 40, respectively. A table nut 203 is engaged with the feed screw shaft 202 through a ball, and first and second intermediate support nuts 204, 205 are engaged with the front and rear portions of the feed screw shaft 202 through balls, respectively. To the flange portion of the table nut 203 is fixed through a mounting member 42 a table drive motor (a hollow motor) 41 for driving a table which is provided so as to extend through the feed screw shaft 202.

Two guide rails 206, 206 are disposed in parallel to the feed screw shaft 202 with the feed screw shaft 202 between them and are fixed to a base member 207, respectively. Two table sliders 208 are fitted with each of the guide rails 206, 206 through balls respectively and, before and behind the table sliders 208, 208 on the same guide rail, two intermediate support sliders 209, 209 are similarly fitted with the guide rail 206 through balls, respectively.

A table 210 is placed on the four table sliders 208 and the table 210 and table drive motor 41 are fixed through a bracket 43. Slide bearings 211 are fitted with the outer peripheral surfaces of the first and second intermediate support nuts 204, 205 and are fixed by bolts B5 through brackets 212. The slide bearing 211 is fitted with an intermediate support frame 29 and is prevented from slipping off by a plate 234. The respective longitudinal ends of the intermediate support frames 29, 29 are fixed to the intermediate support sliders 209, 209 to form first and second supports 226 and 227, respectively. The first and second supports 226 and 227 are screwed and fixed to each other by bolts 6 through a connecting plate 44. Adjacent to the connecting plate 44, there is disposed an auxiliary feed screw 216 in parallel to the guide rail 206 and the two ends of the auxiliary feed screw 216 are rotatably journaled by a support bearing 218 and support unit 217 respectively. An intermediate support feed nut 224 is in threaded engagement with the auxiliary feed screw 216 through a ball, while the end face of the auxiliary feed screw 216 on the support unit 217 side thereof is connected to the output shaft of the intermediate support driving motor 45. The intermediate support feed nut 224 is fixed to the connecting plate 44 in the neighborhood of the central portion of the connecting plate 44.

Next, description will be given below of the operation of the third embodiment of the invention. When the output shaft of the table drive motor 41 is rotated in a given direction, then the table nut 203, which is fixed to the output shaft of the table driving motor 41 through the mounting member 42, is also caused to rotate. Since the two ends of the feed screw shaft 202 are fixed by the fixing blocks 40, as the table nut 203 is rotated, the table nut 203 is moved along the feed screw shaft 202 and, therefore, the table 210 is also moved while it is being guided by the table slider 208. Next, when the intermediate support driving motor 45 is rotationally driven to thereby rotate the auxiliary feed screw 216, then the intermediate support feed nut 224 is moved along the auxiliary feed screw 216. At that time, since the connecting plate 44 connecting the first and second intermediate supports 226 and 227 to each other is connected to the intermediate support feed nut 224, the first and second supports 226 and 227 are moved linking with the movement of the intermediate support feed nut 224.

In the third embodiment, unlike the first and second embodiments in which the rotational force of the feed screw shaft 202 is transmitted to the auxiliary feed screw 216 and the auxiliary feed screw 216 is rotated at the reduced and given number of rotation, the number of rotation of the intermediate support driving motor 45 is controlled according to the movement of the table nut 203 due to the rotation of the table driving motor 41, that is, according to the movement of the table 210 to thereby decide the moving positions of the first and second intermediate supports 226 and 227 connected to each other by the connecting plate 44. Similarly to the first embodiment, the relative position relationship between the table nut 203 and first and second intermediate supports 226, 227 is controlled such that the first and second intermediate supports 226 and 227 are always moved to substantially the two central portions of the feed screw shaft respectively between the table nut 203 and fixing blocks 40, 40 regardless of the position of the table nut 203. Therefore, the positions of the first and second intermediate support nuts 204 and 205 can be decided with respect to the table nut 203 similarly to the first embodiment. Thus, since the support span of the feed screw shaft 202 is always shorter than the conventional device, the shaft dangerous speed is increased up to the safety side and the feed screw shaft 202 becomes hard to vibrate, which makes it possible to feed the table nut 203 at high speeds.

Referring now to the previously described first and second embodiment, description has been given of a case in which the pitch of the feed screw shaft is set equal to that of the ball screw groove in the auxiliary feed screw but, however, it is not always necessary to set them to be equal to each other. That is, in this case, the numbers of teeth of the two timing pulleys may be decided respectively with a difference between the two pitches taken into consideration. Also, in the first to third embodiments, although the position of the intermediate support is set so that the intermediate support can support the two central portions respectively between the two end support portions of the feed screw shaft and table nut, the intermediate support may be positioned in the neighborhood of the central potions. Further, in the first to third embodiments, alternatively, the table nut and intermediate support nut may be a single nut or a double nut.

The intermediate support nut is engaged with the feed screw shaft through the ball, the slide bearing is fitted with the outer peripheral surface of the intermediate support nut, and the frame fitted with the slide bearing is supported at the two portions thereof by the slider which is supported on the same guide rail as guides the table. Due to this, the intermediate support of the invention is more stable when compared with a structure in which the frame is fixed to a single slider, and the feed screw shaft and guide rail can be arranged in parallel to each other with accuracy. Also, when the table and intermediate support are moved in the axial direction of the feed screw shaft and pressures are previously given to the ball screw portion of the intermediate support and to the linear guide of the slide bearing and frame fixing portion, whereby the play of the intermediate support is eliminated to thereby be able to prevent the vibration of the feed screw shaft. The intermediate support is moved according to the rotation of the screw shaft of the ball screw, the intermediate support nut is threadedly engaged with the intermediate support through the ball to which a previous pressure has been applied, and the intermediate support is driven by the intermediate support nut which is formed as a previous pressure structure. Due to this, there is eliminated the possibility that the movement of the intermediate support nut corresponding to the rotation of the feed screw shaft can be diverged, which makes it possible to set or control the position of the intermediate support with accuracy or which allows the intermediate support to move without colliding with the table slider fixed to the table. Further, the intermediate support is free from the feed screw shaft and the amount of movement of the intermediate support is decided only by the rotation of the auxiliary feed screw, with the movement of the intermediate support nut having no influence on the rotation of the feed screw shaft.

As a result of this, unlike a structure in which the intermediate support is moved according to the table, it is possible to set or control the position of the intermediate support in such a manner that the intermediate support can increase the natural vibration frequency of the feed screw shaft effectively and it is also possible to reduce the vibration of the feed screw shaft effectively.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated.

What is claimed is:

1. A movable member feed device supported by a guide rail (6, 106, 206) fixed to a base member (7) and movable freely in the axial direction thereof by a feed screw shaft (2, 102, 202), said movable member feed device comprising:

a first intermediate support frame (13, 113, 29) supported by a linear movement bearing (9, 109, 209) fitted with said guide rail (6, 6, 206) and freely movable in the axial direction thereof;

an intermediate support nut (4, 105, 204) threadedly engaged with said feed screw shaft (2, 102, 202) through a ball and supported by said first intermediate support frame (13, 113, 29) in such a manner that it is prevented from moving in the axial direction thereof with respect to said first intermediate support frame (13, 113, 29) and is freely rotatable;

an auxiliary feed screw (16, 116, 216) having an axis parallel to said feed screw shaft (2, 102, 202) and supported on said base member (7);

an intermediate support feed nut (24, 124, 224) threadedly engaged with said auxiliary feed screw (16, 116, 216) and fixed to said first intermediate support frame (13, 113, 29), and auxiliary feed screw drive means (19–21, 119–121, 44–45, 224) for moving said first intermediate support frame (13, 113, 29) according to the rotation of said feed screw shaft (2, 102, 202).

2. A movable member feed device according to claim 1, in which said auxiliary feed screw drive means (19–21, 119–121, 44–45, 224) comprises:

a first timing pulley (19, 119) fixed on said feed screw shaft (2, 102);

a second timing pulley (20, 120) fixed on said auxiliary feed screw (16, 116); and a timing belt (21, 121) being stretched over said first and second timing pulleys so as to transmit the rotation of said feed screw shaft (2, 102) to said auxiliary feed screw (16, 116).

3. A movable member feed device according to claim 2, in which the number of teeth of said second timing pulley (20, 120) is set double the number of teeth of said first timing pulley (19, 119).

4. A movable member feed device according to claim 3, in which said feed screw shaft (2, 102, 202) and said auxiliary feed screw (16, 116, 216) have the same pitch.

5. A movable member feed device according to claim 1, further comprising:

a second intermediate support frame (14, 29) supported by a linear movement bearing (9, 209) fitted with said guide rail (6, 206) and freely movable in the axial direction thereof; and a connecting member (15, 44) for connecting said first intermediate support frame (13, 29) and said second intermediate support frame (14, 29) in such a manner that said first and second support frames are allowed to move together while keeping the predetermined distance therebetween.

6. A movable member feed device according to claim 2, further comprising:

a second intermediate support frame (14, 29) supported by a linear movement bearing (9, 209) fitted with said guide rail (6, 206) and freely movable in the axial direction thereof; and a connecting member (15, 44) for connecting said first intermediate support frame (13, 29) and said second intermediate support frame (14, 29) in such a manner that said first and second support frames are allowed to move together while keeping tile predetermined distance therebetween.

7. A movable member feed device according to claim 5, in which said auxiliary feed screw drive means (44–45, 224) comprises:

an intermediate support driving motor (45) for rotating said auxiliary feed screw (216); and an intermediate support feed nut (224) being moved along said auxiliary feed screw (216), said intermediate support feed nut (224) being coupled with said connecting member (44), wherein said intermediate support driving motor is controlled according to the rotation of said feed screw shaft (202).

8. A movable member feed device according to claim 6, in which said auxiliary feed screw drive means (44–45, 224) comprises:

an intermediate support driving motor (45) for rotating said auxiliary feed screw (216); and an intermediate support feed nut (224) being moved along said auxiliary feed screw (216), said intermediate support feed nut (224) being coupled with said connecting member (44), wherein said intermediate support driving motor is controlled according to the rotation of said feed screw shaft (202).

* * * * *